(12) United States Patent
Rebmann et al.

(10) Patent No.: US 12,195,185 B2
(45) Date of Patent: Jan. 14, 2025

(54) ASSEMBLY KIT FOR AN AIRCRAFT SEAT

(71) Applicant: RECARO Aircraft Seating GmbH & Co. KG, Schwaebisch Hall (DE)

(72) Inventors: Juergen Rebmann, Oldisleben (DE); Thomas Drenzeck, Michelfeld (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 584 days.

(21) Appl. No.: 17/416,224

(22) PCT Filed: Dec. 20, 2019

(86) PCT No.: PCT/EP2019/086528
§ 371 (c)(1),
(2) Date: Jun. 18, 2021

(87) PCT Pub. No.: WO2020/127872
PCT Pub. Date: Jun. 25, 2020

(65) Prior Publication Data
US 2022/0041286 A1 Feb. 10, 2022

(30) Foreign Application Priority Data
Dec. 21, 2018 (DE) .................. 10 2018 133 538.5

(51) Int. Cl.
*B64D 11/06* (2006.01)
(52) U.S. Cl.
CPC .................. *B64D 11/064* (2014.12)
(58) Field of Classification Search
CPC .................................................. B64D 11/064
See application file for complete search history.

(56) References Cited

U.S. PATENT DOCUMENTS 2,513,860 A    8/1950   Blue
2010/0308167 A1  12/2010   Hawkins et al.
(Continued)

FOREIGN PATENT DOCUMENTS

CN    107107788 A    8/2017
CN    108698700 A    10/2018
(Continued)

OTHER PUBLICATIONS

Chinese Search Report dated Sep. 7, 2023 issued in corresponding Chinese Patent Application No. 201980092413.8 (and English machine translation).

(Continued)

*Primary Examiner* — Anthony D Barfield
(74) *Attorney, Agent, or Firm* — Posz Law Group, PLC

(57) ABSTRACT

An assembly kit for an aircraft seat comprising at least one mounting unit, at least one backrest which is fixedly coupled with the mounting unit in a state when assembled and ready for flight, and at least one connection module, via which the backrest is in particular oriented rigidly in a position relative to the mounting unit in the assembled and ready-for-flight state, and the connection module comprises at least one adjusting element, by means of which the backrest is orientable respectively in at least two different backrest adjustment angles relative to the mounting unit without requiring new approval, and/or comprises at least two connection elements, by means of which the backrest can be fixedly mounted respectively in at least two different backrest adjustment angles relative to the mounting unit, the at least two connection elements being mountable without requiring new approval.

11 Claims, 5 Drawing Sheets

(56) References Cited

U.S. PATENT DOCUMENTS

Figure 1:
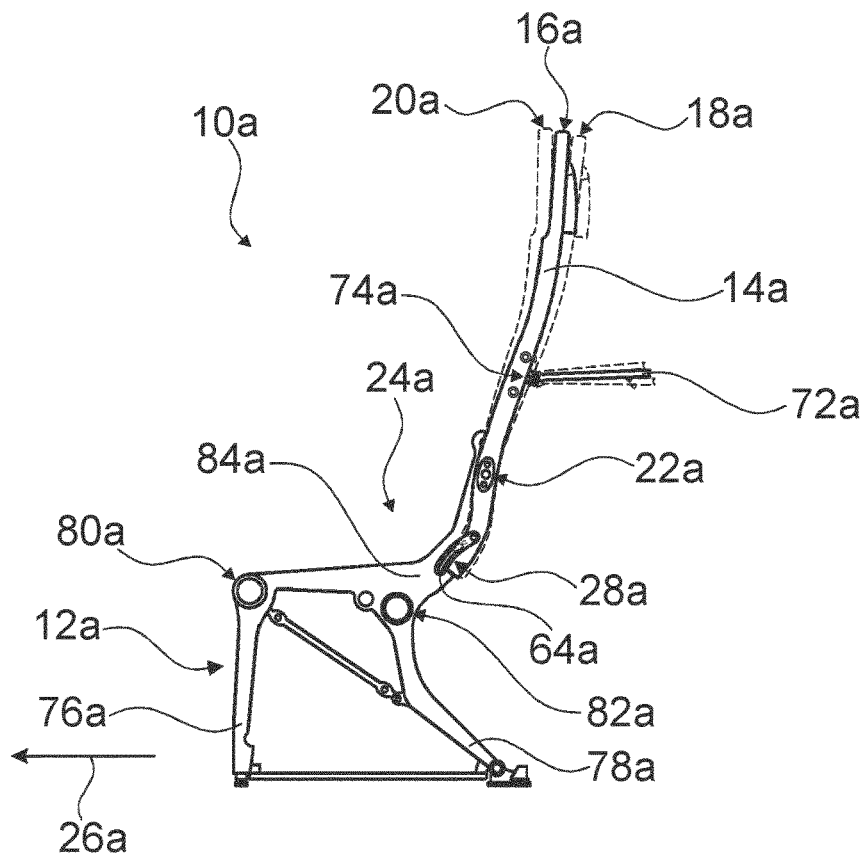

| | | | |
|---|---|---|---|
| 2017/0023346 A1 | 1/2017 | Phillips |
| 2017/0355289 A1 | 12/2017 | Spangler et al. |
| 2018/0134394 A1 | 5/2018 | Weifenbach |
| 2018/0305024 A1 | 10/2018 | Blanck et al. |
| 2019/0002106 A1 | 1/2019 | Stachel et al. |
| 2019/0366883 A1 | 12/2019 | Ultsch et al. |

FOREIGN PATENT DOCUMENTS

| | | |
|---|---|---|
| DE | 19724763 A1 | 12/1998 |
| DE | 102005022694 A1 | 11/2006 |
| DE | 102016224625 A1 | 6/2018 |
| EP | 0336852 A1 | 10/1989 |
| FR | 2948326 A1 | 1/2011 |
| WO | 2010/005678 A2 | 1/2010 |
| WO | 2015/055551 A1 | 4/2015 |

OTHER PUBLICATIONS

German Search Report dated Dec. 12, 2019, issued in corresponding DE Patent Application No. 102018133538.5 (and English Machine Translation).

International Search report dated Apr. 28, 2020, issued in corresponding International Patent Application No. PCT.EP2019/086528.

International Preliminary Report on Patentability Chapter I dated Jun. 16, 2021, issued in corresponding International Patent Application No. PCT/EP2019/086528.

European Office Action mailed Mar. 20, 2023 in corresponding EP Patent Application No. 19 835 397.1 (and English translation).

Office Action mailed Mar. 27, 2024 in corresponding Chinese Patent Application No. 201980092413.8 (and English translation).

ASSEMBLY KIT FOR AN AIRCRAFT SEAT

CROSS REFERENCE TO RELATED APPLICATIONS

This application is a U.S. national stage application of PCT/EP2019/086528 filed on Dec. 20, 2019, which is based on German Patent Application No. 10 2018 133 538.5 filed on Dec. 21, 2018, the contents of which are incorporated herein by reference.

STATE OF THE ART

The invention concerns an assembly kit according to the preamble of patent claim 1.

An assembly kit for an aircraft seat has already been proposed, with at least one mounting unit, with at least one backrest which is fixedly coupled with the mounting unit in a state when assembled and ready for flight, and with at least one connection module, via which the backrest is in particular oriented rigidly in a position relative to the mounting unit in the assembled and ready-for-flight state.

The objective of the invention is in particular to provide a generic device having improved characteristics regarding a flexible assembly of a backrest that requires no new approval. The objective is achieved according to the invention by the features of patent claim 1 while advantageous implementations and further developments of the invention may be gathered from the subclaims.

Advantages of the Invention

The invention is based on an assembly kit for an aircraft seat, with at least one mounting unit, with at least one backrest which is fixedly coupled with the mounting unit in a state when assembled and ready for flight, and with at least one connection module, via which the backrest is in particular oriented rigidly in a position relative to the mounting unit in the assembled and ready-for-flight state.

It is proposed that the connection module comprises at least one adjusting element, by means of which the backrest is orientable respectively in at least two different backrest adjustment angles relative to the mounting unit without requiring new approval, and/or comprises at least two connection elements, by means of which the backrest can be fixedly mounted respectively in at least two different backrest adjustment angles relative to the mounting unit, the at least two connection elements being mountable without requiring new approval. By an "assembled and ready-for-flight state" is in particular a state to be understood in which the aircraft seat is ready for use in an employment which the aircraft seat is intended for. Furthermore, an assembled and ready-for-flight state is in particular to mean a state in which all essential components of the aircraft seat, in particular the backrest, a seat bottom and at least one armrest, are mounted correctly, such that loads occurring in an operation of the aircraft seat can be transmitted. Moreover, an assembled and ready-for-flight state is in particular to pertain to an aircraft seat that is approved for flight operations with a person according to international aviation standards. "Configured" is in particular to mean specifically designed and/or equipped. By an object being configured for a certain function is in particular to be understood that the object fulfills and/or executes said certain function in at least one application state and/or operation state. By a "mounting unit" is in particular a unit to be understood which is configured for a mounting of an aircraft seat, in particular an aircraft seat with at least one seat bottom and with at least one backrest, on a floor, in particular a cabin floor of an aircraft cabin. The mounting unit is in particular configured for transmitting weight forces of the aircraft seat and, should a person be sitting on the seat, weight forces of the person sitting on the aircraft seat and/or acceleration forces, which are caused by a transport and act on the person, to the floor. Preferably he mounting unit comprises at least one coupling point, via which the backrest is pivotably connected to the mounting unit in a state when it is not completely assembled. By a "connection module" is in particular a module to be understood which is configured to connect the backrest to the mounting unit, wherein the connection module in particular provides a connection possibility or preferably a plurality of connection possibilities. A "connection possibility" is in particular meant to be understood as a possibility of connecting the backrest to the mounting unit by means of a connection element, each connection possibility of a connection module facilitating a different backrest adjustment angle. Preferably each connection element has precisely one connection possibility. Particularly preferably, in an assembled and ready-for-flight aircraft seat, for each connection module a connection element is mounted in a connection possibility. "Rigidly" is in particular to mean immovably. Preferably the backrest is not adjustable in its assembled and ready-for-flight state. By an "adjusting element" is in particular an element to be understood which is configured for an adjustment of the backrest in at least two positions, in particular positions with at least two different backrest adjustment angles. The at least one adjusting element may principally also be configured and/or used for tolerance compensation. Preferentially the at least one adjusting element is coupled with the backrest. Preferably the at least one adjusting element is coupled with the mounting unit. Preferably the at least one adjusting element comprises at least one guiding track. The at least one guiding track in particular has a round shape, an elliptic shape or a straight shape. Especially preferentially the at least one adjusting element is configured for an eccentric adjustment. Alternatively, the at least one adjusting element may have at least one long hole. The adjusting element is in particular configured for an adjustment of the backrest adjustment angle. A "backrest adjustment angle" is in particular to mean an angle between the mounting plane and a backrest surface formed by the backrest, wherein the at least two different backrest adjustment angles essentially differ from one another. The backrest adjustment angle is preferably greater than 90 degrees and smaller than 180 degrees. Particularly preferably the backrest adjustment angle is implemented so as to start from the backrest surface, in a forward direction toward the mounting plane. By a "mounting plane" is herein in particular a plane to be understood which the aircraft seat is mounted on. The mounting plane is here in particular implemented by the cabin floor of the aircraft cabin. Preferably the backrest adjustment angle is implemented so as to start from the backrest surface, in a forward direction toward the cabin floor of the aircraft cabin. "To essentially differ from one another" is in particular to mean, in this context, that the at least two different backrest adjustment angles have an angle difference that is in particular more than plus or minus 1 degree. A manufacturing tolerance is in particular precisely plus or minus 1 degree. The angle difference between the at least two different backrest adjustment angles is preferably maximally 3 degrees and particularly preferably precisely 3 degrees. The angle difference is in particular configured to enable at least two different positions of the backrest, and is in particular not configured to merely compensate a manufacturing tolerance. In particular, the backrest has in its assembled and ready-for-flight state a standard position, a comfort position or an upright position. A "standard position" is here in particular to mean a normal upright position of the backrest, a backrest adjustment angle of the standard position being, for example, 100 degrees. A "comfort position" is in particular to mean a position of the backrest that is inclined rearwards relative to the standard position, a backrest adjustment angle of the comfort position being greater than the backrest adjustment angle of the standard position, in particular by 3 degrees. An "upright position" is in particular to mean a position of the backrest that is inclined forwards relative to the standard position, a backrest adjustment angle of the upright position being smaller than the backrest adjustment angle of the standard position, in particular by 3 degrees. Preferably the aircraft seat has a sitting direction. The terms "rearwards" and "forwards" are in particular meant relative to the sitting direction. In an upright position of the aircraft seat, in which the backrest is oriented at least substantially perpendicularly to a floor, the sitting direction is parallel to the floor and is oriented at least substantially perpendicularly to the backrest surface formed by the backrest. By a "sitting direction" is here in particular a direction to be understood which, with a passenger sitting in an appropriate manner, in particular with the passenger's thighs being arranged in parallel, is substantially equivalent to the direction in which the passenger's thighs extend from the passenger's buttocks to his knee region. The sitting direction in particular corresponds to a flight direction. Preferably an aircraft seat with a backrest in the comfort position is configured to be arranged in a premium area of an aircraft cabin. By a "premium area" is here in particular a region of an aircraft cabin to be understood which offers enhanced comfort to the passenger, in particular more leg space and a larger living space, for example by a comparably large distance between aircraft seats, a comparably small number of aircraft seats in the area, a proximity to an emergency exit and/or a comparably comfortable backrest adjustment. Preferably an aircraft seat with a backrest in the upright position is configured to be arranged in an aircraft cabin in an emergency exit row, in front of an emergency exit row and/or in a row to the front of a cabin divider element. A "cabin divider element" is here in particular to mean a partition wall, a lavatory unit, a kitchen unit and/or a crew rest compartment. By a "connection element" is in particular an element to be understood which is configured for connecting, preferably directly connecting, at least the backrest to the mounting unit, for supporting the backrest against the mounting unit and/or for enabling a force transfer between the backrest and the mounting unit. Preferably at least one connection element is implemented so at to be optimized in regard to a load path. "Fixedly mountable" is in particular to mean connected to each other so as to be non-adjustable in a defined position. Moreover, fixedly mountable is in particular to mean that the backrest has in its assembled and ready-for-flight state a position, in particular the standard position, the comfort position or the upright position, and cannot be varied in its position, in particular not by a passenger.

By "orientable without requiring new approval" is in particular to be understood that no new approval in compliance with international aviation standards is necessary, in particular if the backrest adjustment angle is changed, in particular by an adjustment of the backrest adjustment angle via the adjusting element. "Mountable without requiring new approval" is in particular to mean that no new approval of the aircraft seat in compliance with international aviation standards is necessary, in particular if the backrest adjustment angle is change, in particular using a different connection element. In particular, mountable without requiring new approval is also to mean that in case of an adjustment of the backrest between the standard position, the comfort position and the upright position no new approval of the aircraft seat is required. Without requiring new approval is furthermore in particular to mean that new approval, in particular no new HIC test (Head Injury Criterion test) is necessary for an approved aircraft seat if the backrest adjustment angle is changed by +3 degrees or −3 degrees with respect to the standard position of the backrest, taking the manufacturing tolerance of +1 degree and −1 degree into account. The aircraft seat is preferably realized as an HIC-approved aircraft seat. Particularly preferably the aircraft seat is approved with its backrest in the standard position. Preferably the at least two connection elements are mountable without requiring new approval. Preferably the at least two connection elements are exchangeable without requiring new approval. Due to the implementation according to the invention an aircraft seat is advantageously mountable with at least two different backrest adjustment angles, wherein an HIC test needs to be executed only for one of the at least two different backrest adjustment angles. The assembly kit according to the invention thus enables a cost-reduced production of an aircraft seat. By the implementation according to the invention, advantageously an assembly kit for an aircraft seat is provided which has improved characteristics regarding an approval-free and flexible assembly of a backrest.

It is further proposed that the at least two connection elements are implemented integrally and are mountable at least in a first mounting position and a second mounting position. "Implemented integrally" is in particular to mean connected at least by substance-to-substance bond, for example by a welding process, a gluing process, an injection-molding process and/or by any other process that is deemed expedient by someone skilled in the art, and/or advantageously formed in one piece, like for example by a production from a cast and/or by a production in a one-component or multi-component injection-molding process, and advantageously from a single blank. Such an implementation advantageously allows reducing a diversity of structural components. As a result, production costs and storage costs are advantageously reducible.

Furthermore it is proposed that the at least two connection elements are implemented by spatially separable elements. Preferably the at least two connection elements are implemented by elements which are spatially separable from one another. "Spatially separable" is in particular to mean, in this context, that the at least two connection elements are realized as separate independent components and/or can be separated from one another by applying force, without tools. This implementation allows an advantageous assembly of a respective connection element. Assembly errors are advantageously avoidable by way of this implementation. As a result, the weight of the aircraft seat is advantageously kept at a low level.

It is also proposed that at least one of the connection elements is realized as a plate. By a "plate" is herein in particular a planar component to be understood which forms on two opposite-situated sides respectively one at least substantially parallel, planar surface, a thickness of the plate being in particular maximally 50%, preferably maximally 20% and particularly preferably maximally 10% of a length of the plate or of a width of the plate. Preferably the at least one connection element is implemented of a metallic material, in particular a metal sheet. Preferentially the at least one connection element has been punched or lasered out of a metal sheet. The at least one connection element may principally also be implemented of a fiber composite material, like for example a CFR composite or a GFR composite. This implementation allows realizing a connection element that is advantageously simply producible and cost-efficient.

It is moreover proposed that the at least one adjusting element is implemented as an eccentric adjusting element. By an "eccentric adjusting element" is in particular an element to be understood which is configured to be rotated around a rotation axis, thus exerting—on an outer surface facing away from the rotation axis—a force onto a third element, wherein a distance between the rotation axis and the outer surface is nonuniform along a circumferential direction. The eccentric adjusting element is preferably implemented as a round disk comprising a coupling element that is arranged eccentrically on the disk. Preferably the eccentric adjusting element is supported rotatably. Preferably the eccentric adjusting element has a rotation axis. Preferably the eccentric adjusting element is arranged at least partly in the backrest. Preferably the eccentric adjusting element is coupled with the backrest. Alternatively, it is also conceivable that the eccentric adjusting element is arranged at least partly in the mounting unit. The eccentric adjusting element is in particular configured for an adjustment of the backrest adjustment angle. This implementation allows realizing an advantageous adjustment of the backrest adjustment angle. By using the eccentric adjusting element it is advantageously possible to save construction space.

Beyond this it is proposed that at least one of the connection elements has at least two connection points. A "connection point" is in particular to mean a point in or on the connection element which is configured for a coupling of the connection element with the mounting unit or with the backrest. Preferably at least one connection point is realized as a recess, preferably in particular as a through hole. Principally the at least one connection point could as well be implemented as an elevation. Preferably the at least one connection point is configured to be coupled with the coupling element of the eccentric adjusting element. Preferably the eccentric adjusting element is configured to change a distance between the rotation axis of the eccentric adjusting element and at least one of the connection points. This implementation allows achieving an advantageous connection of the backrest to the mounting unit.

It is also proposed that at least one of the connection elements comprises at least one first connection point, via which the at least one connection element is fixedly couplable with the mounting unit, and comprises at least one second connection point, via which the at least one connection element is fixedly couplable with the backrest. Preferably at least one of the connection elements is couplable with the mounting unit by means of a connection member, for example a bolt. Preferably at least one of the connection elements is couplable with the backrest by means of a further connection member, for example a bolt. This implementation allows achieving an advantageous connection of the backrest to the mounting unit.

Furthermore it is proposed that a first distance between a first connection point and a second connection point of a first connection element differs from a second distance between a first connection point and a second connection point of an at least second connection element. The first distance differs from the second distance in particular by at least 1%, preferably by at least 5% and particularly preferably by at least 10 5 of the second distance. Preferably a different distance is configured for adjusting a different backrest adjusting angle. By this implementation it is advantageously possible to adjust at least two backrest adjustment angles by means of at least two connection elements.

It is moreover proposed that at least one of the connection elements comprises at least one destruction point. By a "destruction point" is herein in particular a point of the connection element to be understood which is designed such that in case of a defined force impact the connection element will fail in this point first. Preferably the at least one destruction point fails in an overload case. An "overload case" is here in particular to mean a crash case in which a passenger hits the backrest in the sitting direction. By this implementation the backrest is advantageously realized such that it is pivotable in an overload case. As a result, a risk of injury is advantageously reduced for a passenger.

It is further proposed that the assembly kit comprises at least one securing element, which is configured, in case of a failure of at least one of the connection elements in the overload case, to delimit a movement of the backrest to a maximum pivot. By a "securing element" is here in particular an element to be understood which permits a movement of the backrest relative to the mounting unit in a defined range but prevents a movement of the backrest relative to the mounting unit beyond that range. The at least one securing element is in particular implemented as a plate. Preferably the at least one securing element is implemented of a metallic material, in particular a metal sheet. Preferably the at least one securing element has been punched or lasered out of a metal sheet. The at least one securing element may principally also be implemented of a fiber composite material, like for example a CFR composite or a GFR composite. Preferably the at least one securing element comprises a guiding groove. The guiding groove is in particular configured for guiding a connection member, in particular a bolt, which is fixedly connected with the mounting unit. A "maximum pivot" is in particular to mean a defined, maximally pivoted deflection of the backrest, starting from the standard position frontwards. Preferably, in the maximum pivot an angle of the backrest, starting from the backrest adjustment angle in the standard position, is in particular smaller than 90 degrees, preferably smaller than 45 degrees and particularly preferably smaller than 30 degrees. This implementation allows realizing a cost-efficient securing element which is advantageously simply manufacturable. As a result, it is advantageously possible to combine the securing element with at least one connection element. By this implementation an injury of the passenger, caused in particular by a forward-pivoted backrest, is advantageously avoidable in the overload case.

Beyond this it is proposed that the at least one securing element comprises at least one delay element, which is at least configured to convert a movement energy of the backrest. By a "delay element" is herein in particular an element to be understood which is configured for an, in particular continuous, reduction of a movement velocity of the backrest in the overload case, preferably by converting a movement energy, in particular into a deformation energy. The delay element is preferably arranged in the guiding groove. Preferably the guiding groove is narrowed by the delay element up to the maximum pivot. Preferably the delay element is configured to plastically deform the securing element by a movement energy. The delay element may principally also be embodied as a spring. By this implementation it is advantageously possible to decelerate the backrest up to the maximum pivot.

It is also proposed that the assembly kit comprises at least one attachment component, which is supported pivotably on the backrest, and at least one adjusting unit, via which the at least one attachment component is respectively orientable in at least two different angles with respect to the backrest in a usage position. An "attachment component" is in particular to mean a table unit that is connected to the backrest, a beverage holder, a screen, and/or a depositing element. By an "adjusting unit" is in particular a unit to be understood which is configured to adjust an angle of the at least one attachment component in the usage position such that said angle corresponds to the chosen backrest adjustment angle. Preferably the adjusting unit comprises at least one latch element, at least one further adjusting element, in particular a further eccentric adjusting element, and/or at least one grub screw. By this implementation an attachment component is advantageously adaptable to the backrest adjustment angle.

Furthermore, an aircraft seat is proposed, which is produced by means of an assembly kit according to the invention. Especially preferentially the at least two connection elements are mountable without new approval of the aircraft seat. Preferably the at least two connection elements are exchangeable without new approval of the aircraft seat. Moreover a method for the assembly of an aircraft seat with an assembly kit according to the invention is proposed.

The assembly kit according to the invention is herein not to be restricted to the application and implementation described above. In particular, in order to fulfill a functionality that is described here, the assembly kit according to the invention may comprise a number of individual elements, components and units that differs from a number given here.

DRAWINGS

Further advantages will become apparent from the following description of the drawings. In the drawings five exemplary embodiments of the invention are shown. The drawings, the description and the claims contain a plurality of features in combination. Someone skilled in the art will purposefully also consider the features separately and will find further expedient combinations.

Figure 2:
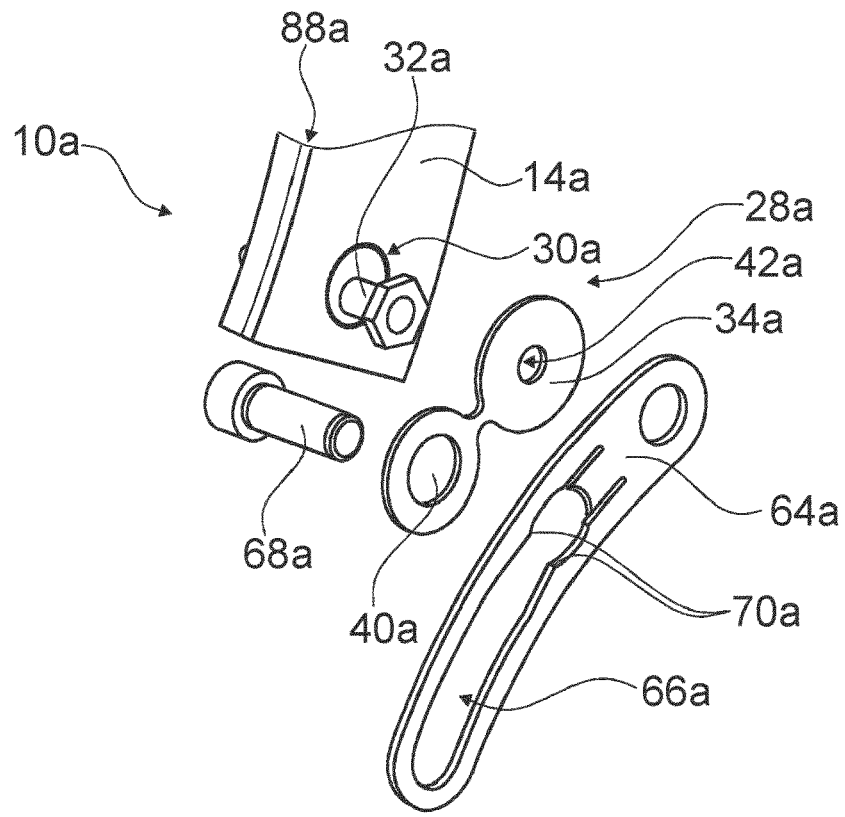
Figure 3:
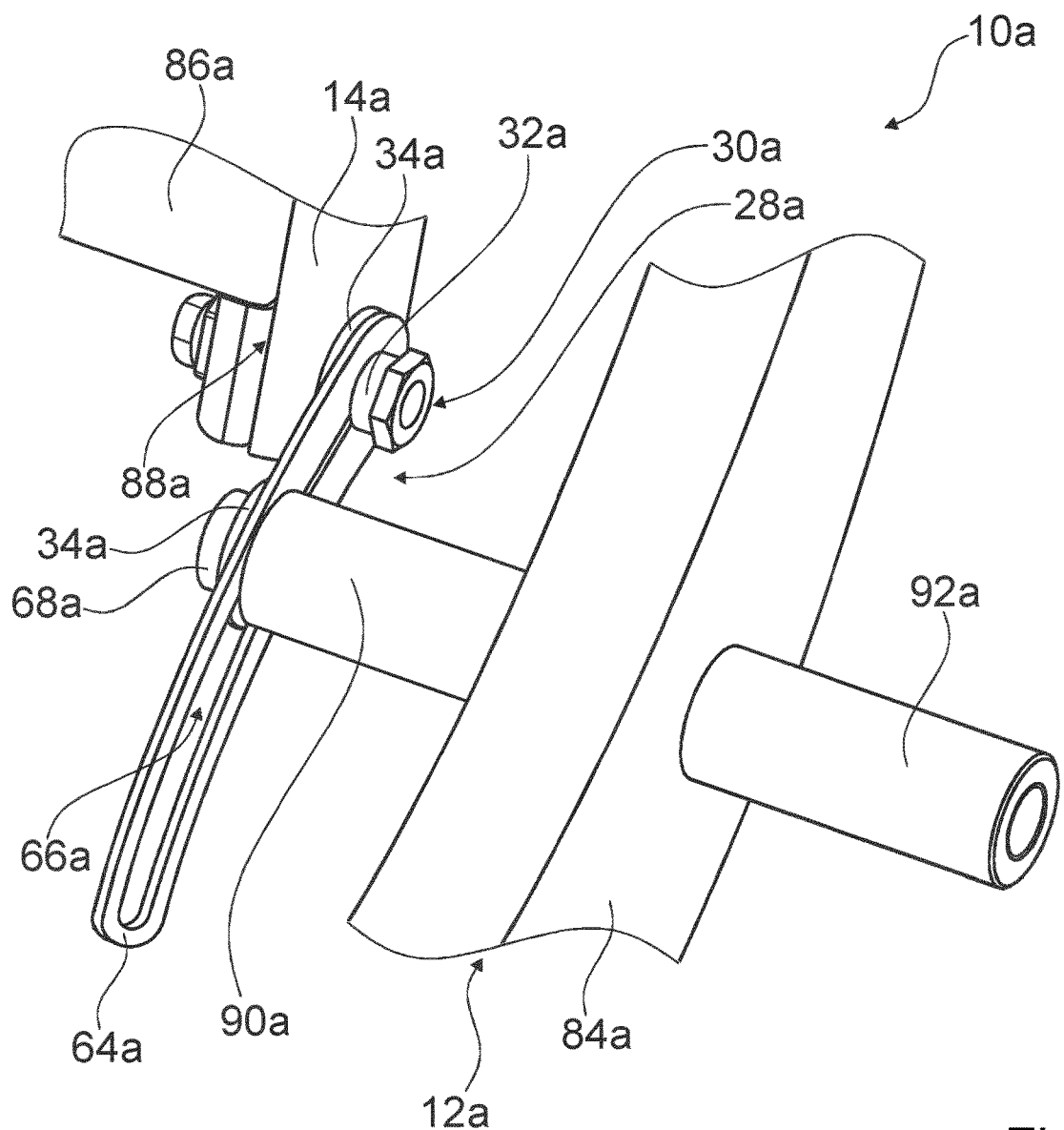
Figure 4:
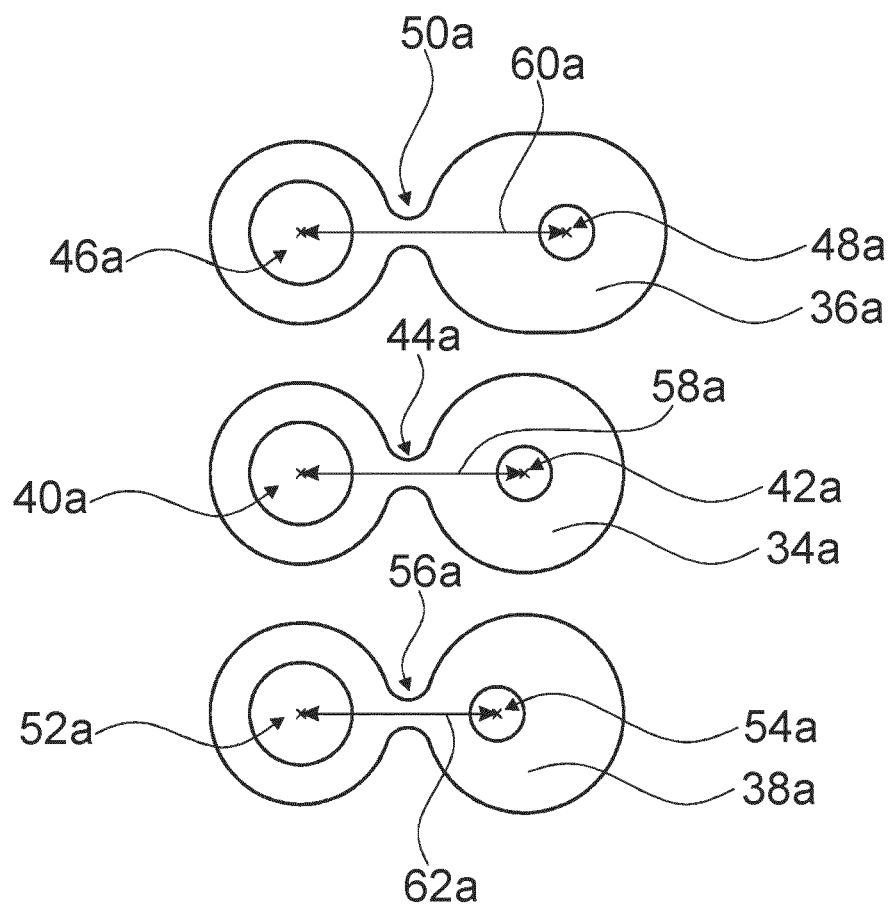
Figure 5:
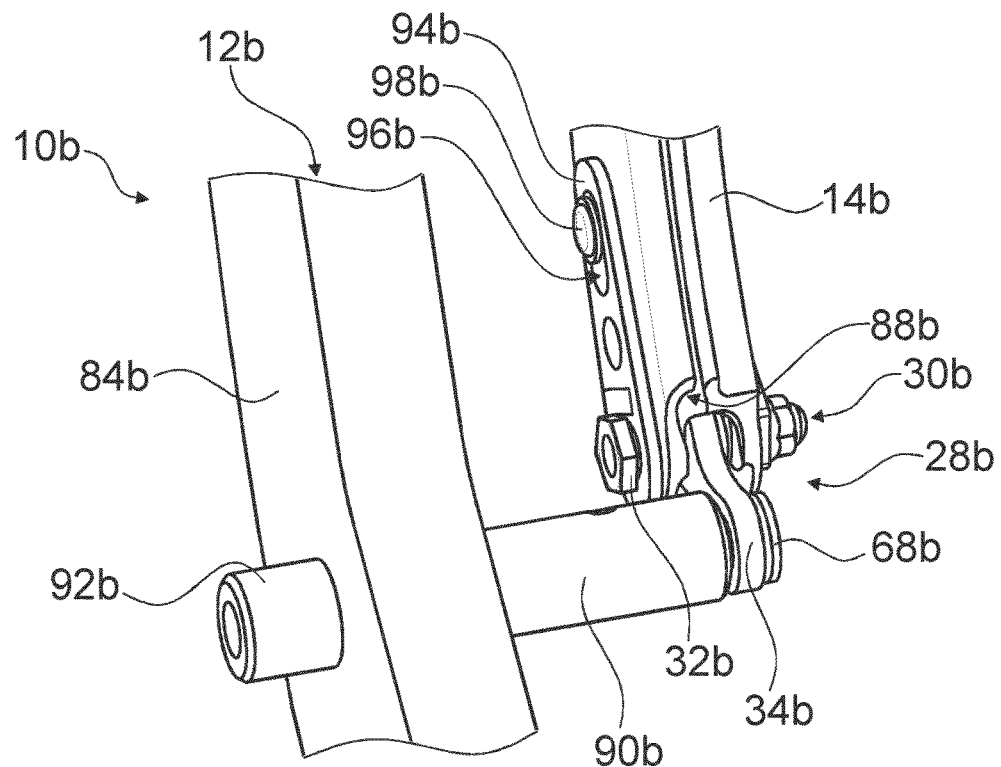
Figure 6:
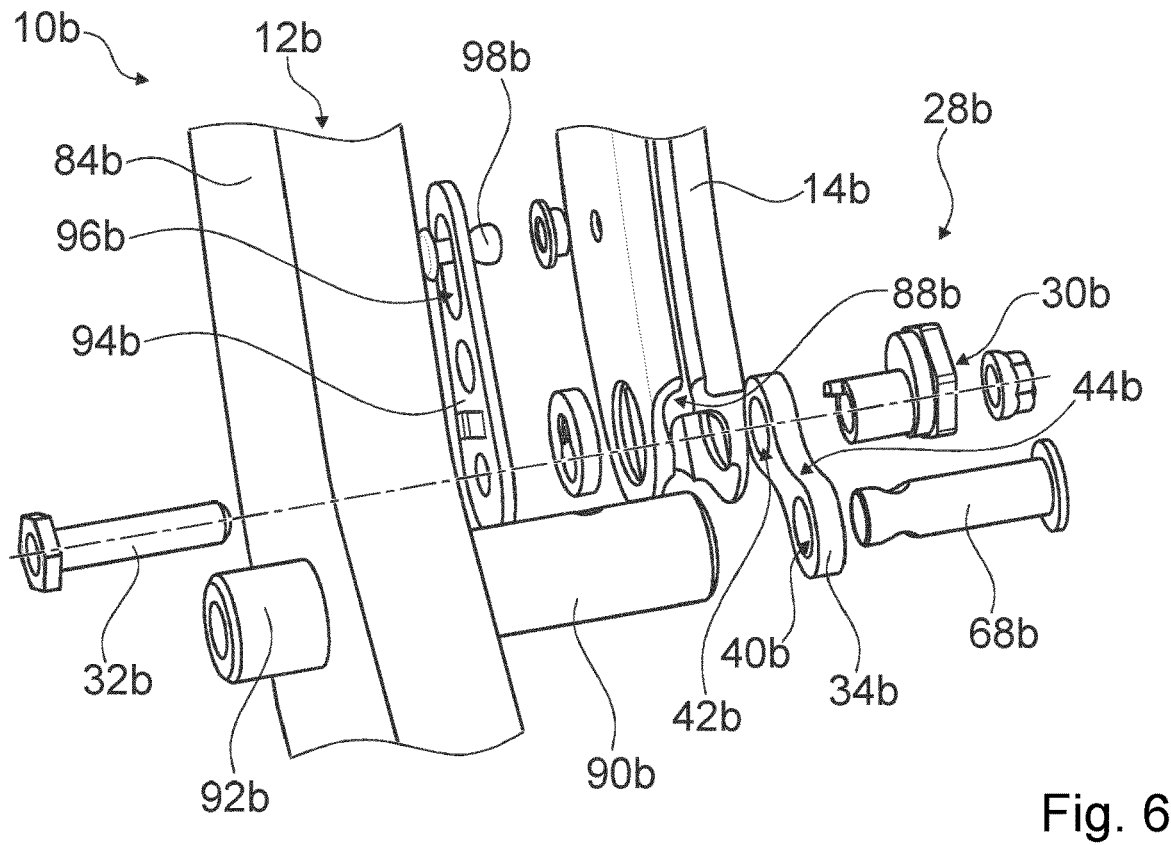
Figure 7:
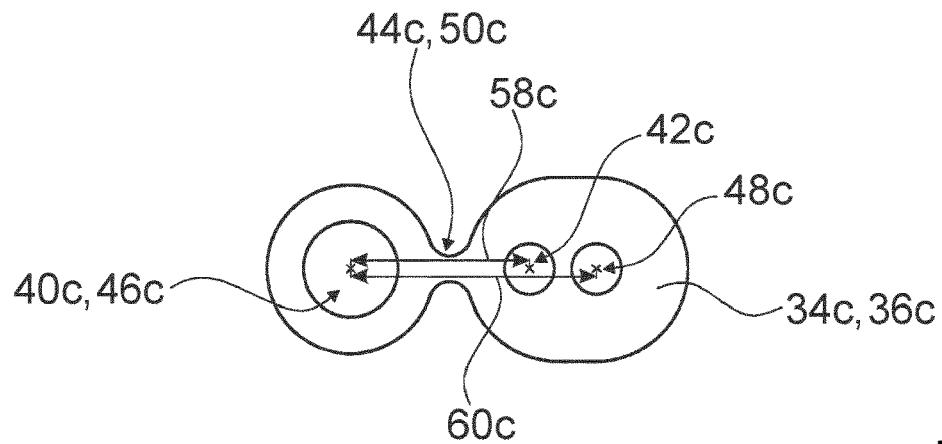
Figure 8:
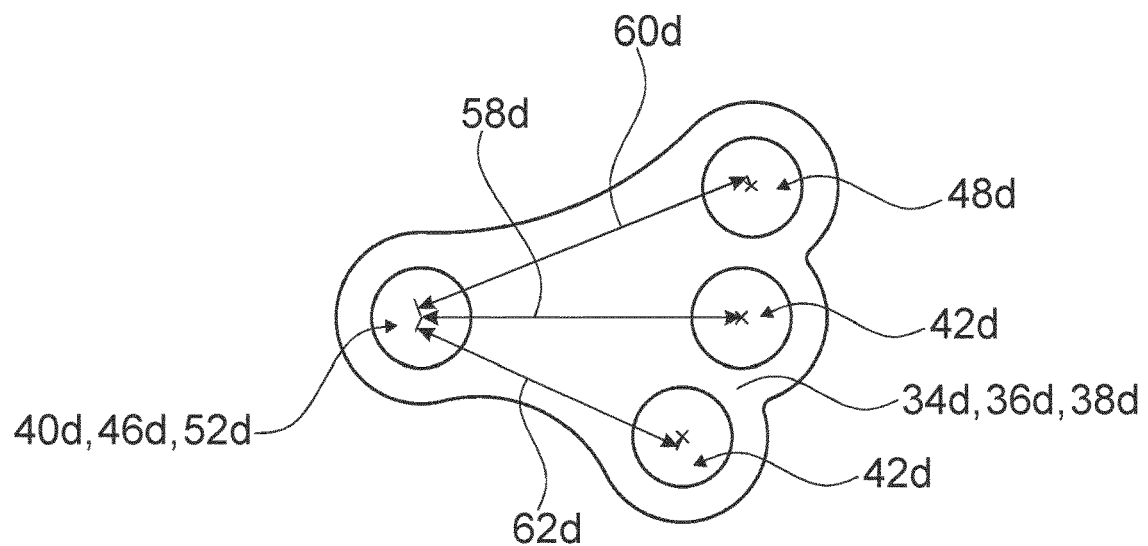
Figure 9:
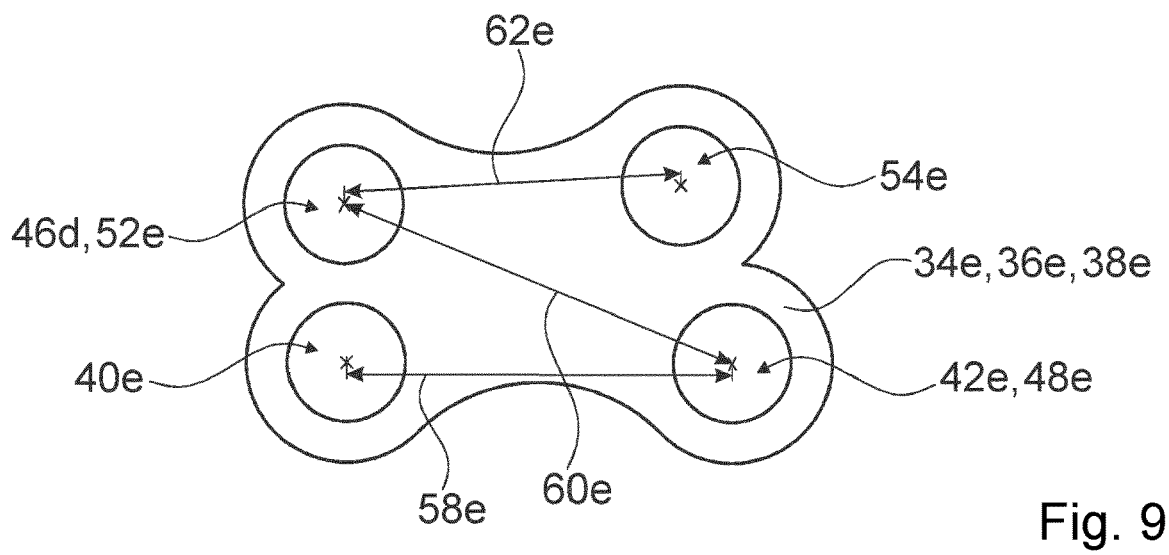

It is shown in:

FIG. 1 an assembly kit according to the invention for an aircraft seat in a first exemplary embodiment, FIG. 2 the assembly kit according to the invention for the aircraft seat in the first exemplary embodiment, in an exploded view, FIG. 3 the assembly kit according to the invention for the aircraft seat in the first exemplary embodiment, FIG. 4 three connection elements in the first exemplary embodiment, FIG. 5 an assembly kit according to the invention for an aircraft seat in a second exemplary embodiment, FIG. 6 the assembly kit according to the invention for the aircraft seat in the second exemplary embodiment, in an exploded view, FIG. 7 two connection elements in a third exemplary embodiment, FIG. 8 three connection elements in a fourth exemplary embodiment, and FIG. 9 three connection elements in a fifth exemplary embodiment.

DESCRIPTION OF THE EXEMPLARY EMBODIMENTS

In FIGS. 1 to 4 a first exemplary embodiment of an assembly kit according to the invention 10a and of a corresponding aircraft seat 24a is illustrated.

In an assembled and ready-for-flight state, the assembly kit 10a forms the aircraft seat 24a (FIG. 1). The aircraft seat 24a is produced by means of the assembly kit according to the invention 10a. The aircraft seat 24a has a sitting direction 26a.

The assembly kit 10a comprises a mounting unit 12a. The mounting unit 12a is configured to be mounted on a cabin floor of an aircraft, which is not shown in detail. The cabin floor forms a mounting plane. The mounting unit 12a is configured to transmit loads which act onto the aircraft seat 24a into the cabin floor. The mounting unit 12a comprises a front seat foot 76a. The mounting unit 12a comprises a rear seat foot 78a. The mounting unit 12a comprises a front crossbeam 80a. The mounting unit 12a comprises a rear crossbeam 82a. The mounting unit 12a comprises at least one seat divider 84a. The aircraft seat 24a comprises a seat divider 84a and a further seat divider, which is not shown in detail. Viewed in the sitting direction 26a, the seat divider 84a is arranged on a lefthand side of the aircraft seat 24a. Viewed in the sitting direction 26a, the further seat divider, which is not shown in detail, is arranged on a righthand side of the aircraft seat 24a. The seat divider 84a is in the present case implemented integrally with the front seat foot 76a and the rear seat foot 78a. The assembly kit 10a comprises a backrest 14a. The backrest 14a comprises a covering 86a. The backrest 14a comprises a rand 88a. The covering 86a is connected to the backrest 14a in a form-fit manner via the rand 88a. Principally the covering 86a could also be connected to the backrest 14a by means of a different connection that is deemed expedient by someone skilled in the art. The backrest 14a forms a backrest surface, which is not shown in detail. The backrest 14a is oriented in a backrest adjustment angle (not shown in detail) relative to the mounting unit 12a. In the state when assembled and ready for flight, the backrest 14a is non-adjustable. The backrest 14a has in the assembled and ready-for-flight state a standard position 16a, a comfort position 18a or an upright position 20a. In the assembled and ready-for-flight state the backrest 14a is fixedly coupled with the mounting unit 12a. In the assembled and ready-for-flight state the backrest 14a is fixedly coupled with the seat divider 84a and with the further seat divider that is not shown in detail. The mounting unit 12a comprises a coupling point 22a. In a state when it is not completely assembled, the backrest 14a is pivotably connected to the mounting unit 12a via the coupling point 22a.

The assembly kit 10a comprises two connection modules 28a. Viewed in the sitting direction 26a, one connection module 28a is arranged on a lefthand side of the backrest 14a. Viewed in the sitting direction 26a, a further connection module (not shown in detail) is arranged on a righthand side of the backrest 14a. The further connection module is in particular implemented in a mirrored fashion relative to the connection module 28a. It is principally also conceivable that the assembly kit 10a comprises only one connection module 28a.

The connection module 28a comprises an adjusting element 30a. By means of the adjusting element 30a, the backrest 14a can be oriented relative to the mounting unit 12a respectively in three different backrest adjustment angles. The adjusting element 30a is realized as an eccentric adjusting element (FIGS. 2 and 3). By means of the adjusting element 30a, the backrest 14a can be oriented relative to the mounting unit 12a respectively in three different backrest adjustment angles. The adjusting element 30a is embodied as a round disk. The adjusting element 30a comprises a coupling element 32a, which is arranged eccentrically to the disk. The coupling element 32a is embodied as a bolt. The adjusting element 30*a* is supported rotatably. The adjusting element 30*a* has a rotation axis (not shown in detail). The adjusting element 30*a* is partly arranged in the backrest 14*a*. The adjusting element 30*a* is coupled with the backrest 14*a*. The adjusting element 30*a* is configured for an adjustment of a backrest adjustment angle.

The connection module 28 comprises three connection elements 34*a*, 36*a*, 38*a* (FIG. 4). By means of the three connection elements 34*a*, 36*a*, 38*a* the backrest 14*a* is fixedly mountable relative to the mounting unit 12*a* respectively in three different backrest adjustment angles. The three connection elements 34*a*, 36*a*, 38*a* are mountable without requiring new approval. The three connection elements 34*a*, 36*a*, 38*a* are exchangeable without requiring new approval. The three connection elements 34*a*, 36*a*, 38*a* are mutually interchangeable, wherein no new approval of the aircraft seat 24*a* is necessary. The three connection elements 34*a*, 36*a*, 38*a* are implemented by spatially separable elements. In the assembled and ready-for-flight aircraft seat 24*a* only one connection element 34*a*, 36*a*, 38*a* is mounted for each connection module 28*a*.

In the present case a backrest adjustment angle is adjustable by means of the adjusting element 30*a* that is implemented as an eccentric adjusting element or by means of the three connection elements 34*a*, 36*a*, 38*a*. It is principally also conceivable that the connection module 28*a* comprises at least one adjusting element 30*a* or at least two connection elements 34*a*, 36*a*, 38*a*.

The connection module 28*a* comprises the first connection element 34*a* (FIG. 4). The first connection element 34*a* is embodied as a plate. The first connection element 34*a* is implemented as a single separate component. The first connection element 34*a* is made of a metallic material, in particular a metal sheet. The first connection element 34*a* comprises two connection points 40*a*, 42*a*. The first connection element 34*a* comprises a first connection point 40*a*, via which the first connection element 34*a* is fixedly couplable with the mounting unit 12*a*. The first connection element 34*a* comprises a second connection point 42*a*, via which the first connection element 34*a* is fixedly couplable with the backrest 14*a*. The first connection point 40*a* of the first connection element 34*a* is realized as a through hole. The second connection point 42*a* of the first connection element 34*a* is realized as a through hole. The first connection element 34*a* comprises a first destruction point 44*a*. The first destruction point 44*a* is realized as a waist. Alternatively, the mounting unit 12*a* could also be coupled with the second connection point 42*a* of the first connection element 34*a* and the backrest 14*a* could be coupled with the first connection point 40*a* of the first connection element 34*a*.

The connection module 28*a* comprises the second connection element 36*a* (FIG. 4). The second connection element 36*a* is embodied as a plate. The second connection element 36*a* is implemented as a single separate component. The second connection element 36*a* is made of a metallic material, in particular a metal sheet. The second connection element 36*a* comprises two connection points 46*a*, 48*a*. The second connection element 36*a* comprises a first connection point 46*a*, via which the second connection element 36*a* is fixedly couplable with the mounting unit 12*a*. The second connection element 36*a* comprises a second connection point 48*a*, via which the second connection element 36*a* is fixedly couplable with the backrest 14*a*. The first connection point 46*a* of the second connection element 36*a* is realized as a through hole. The second connection point 48*a* of the second connection element 36*a* is realized as a through hole. The second connection element 36*a* comprises a second destruction point 50*a*. The second destruction point 50*a* is realized as a waist. Alternatively, the mounting unit 12*a* could also be coupled with the second connection point 48*a* of the second connection element 36*a*, and the backrest 14*a* could be coupled with the first connection point 46*a* of the second connection element 36*a*.

The connection module 28*a* comprises the third connection element 38*a* (FIG. 4). The third connection element 38*a* is embodied as a plate. The third connection element 38*a* is implemented as a single separate component. The third connection element 38*a* is made of a metallic material, in particular a metal sheet. The third connection element 38*a* comprises two connection points 52*a*, 54*a*. The third connection element 38*a* comprises a first connection point 52*a*, via which the third connection element 38*a* is fixedly couplable with the mounting unit 12*a*. The third connection element 38*a* comprises a second connection point 54*a*, via which the third connection element 38*a* is fixedly couplable with the backrest 14*a*. The first connection point 52*a* of the third connection element 38*a* is realized as a through hole. The second connection point 54*a* of the third connection element 38*a* is realized as a through hole. The third connection element 38*a* comprises a third destruction point 56*a*. The third destruction point 56*a* is realized as a waist. Alternatively, the mounting unit 12*a* could also be coupled with the second connection point 54*a* of the third connection element 38*a*, and the backrest 14*a* could be coupled with the first connection point 52*a* of the third connection element 38*a*.

A first distance 58*a* between the first connection point 40*a* and the second connection point 42*a* of the first connection element 34*a* differs from a second distance 60*a* between the first connection point 46*a* and the second connection point 48*a* of the second connection element 36*a* (FIG. 4). The second distance 60*a* between the first connection point 46*a* and the second connection point 48*a* of the second connection element 36*a* differs from a third distance 62*a* between the first connection point 52*a* and the second connection point 54*a* of the third connection element 38*a*. The third distance 62*a* between the first connection point 52*a* and the second connection point 54*a* of the third connection element 38*a* differs from the first distance 58*a* between the first connection point 40*a* and the second connection point 42*a* of the first connection element 34*a*. The first distance 58*a*, the second distance 60*a* and the third distance 62*a* are configured to adjust three different backrest adjustment angles. The first distance 58*a* is configured for an adjustment of the standard position 16*a*. The second distance 60*a* is configured for an adjustment of the comfort position 18*a*. The third distance 62*a* is configured for an adjustment of the upright position 20*a*.

The assembly kit 10*a* comprises a securing element 64*a* (FIGS. 2 and 3). The securing element 64*a* is configured, in case of a failure of at least one of the connection elements 34*a*, 36*a*, 38*a* in an overload case, to delimit a movement of the backrest 14*a* to a maximum pivot, which is not illustrated in detail. The securing element 64*a* is embodied as a plate. The securing element 64*a* is made of a metallic material, in particular a metal sheet. The securing element 64*a* comprises a guiding groove 66*a*. The connection module comprises a bolt 68*a*. The guiding groove 66*a* is configured for guiding the bolt 68*a*, which is fixedly connected with the mounting unit 12*a*. The seat divider 84*a* comprises a connecting element 90*a* (FIG. 3). The connecting element 90*a* is configured for a coupling with the backrest 14*a*. The bolt 68*a* has a thread on its front end (FIG. 2). The bolt 68*a* is configured to be screwed into the connecting element 90*a*.

The seat divider 84a comprises a further connecting element 92a. The further connecting element 92a is configured for a coupling with a further backrest, which is not shown in detail.

The securing element 64a comprises a delay element 70a (FIG. 2). The delay element 70a is at least configured to convert a movement energy of the backrest 14a into a deformation energy. The delay element 70a is implemented as a waist of the guiding groove 66a. The delay element 70a is implemented integrally with the guiding groove 66a. The delay element 70a narrows the guiding groove 66a up to the maximum pivot. The delay element 70a is configured to plastically deform the securing element 64a by a movement energy of the backrest 14a. In a pivoting of the backrest 14a up to the maximum pivot the bolt 68a, which is guided in the guiding groove 66a, is configured to push the delay element 70a apart.

The assembly kit 10a comprises an attachment component 72a, which is supported pivotably on the backrest 14a (FIG. 1). The attachment component 72a is implemented as a table unit. The assembly kit 10a comprises an adjusting unit 74a. In a usage position the attachment component 72a can be oriented relative to the backrest 14a respectively in three different angles by means of the adjusting unit 74a. The adjusting unit 74a comprises several grub screws, which are not shown in detail.

The aircraft seat 24a comprises in its assembled and ready-for-flight state exactly one connection element 34a for each connection module 28a (FIGS. 2 and 3). In the present case the aircraft seat 24a is mounted in the standard position 16a. The backrest adjustment angle of the standard position 16a is in the present case 100 degrees. The connection elements 36a, 38a contained in the assembly kit 10a are in the present case not mounted in the aircraft seat 24a. The aircraft seat 24a has been approved with the connection element 34a. The aircraft seat 24a has been approved in the standard position 16a. With each connection element 34a, 36a, 38a a different backrest adjustment angle can be provided. The connection element 36a is configured for an adjustment of the comfort position 18a. The backrest adjustment angle of the comfort position is greater than the backrest adjustment angle of the standard position 16a by 3 degrees. The connection element 38a is configured for an adjustment of the upright position 20a. The backrest adjustment angle of the upright position 20a is smaller than the backrest adjustment angle of the standard position 16a by 3 degrees. The comfort position 18a and the upright position 20a have an angle difference of 6 degrees. By this implementation the aircraft seat 24a, with a backrest 14a that is non-adjustable in the assembled and ready-for-flight state, may have different backrest adjustment angles without requiring new approval, in particular in the standard position 16a, the comfort position 18a and the upright position 20a.

In FIGS. 5 to 9 four further exemplary embodiments of the invention are shown. The following descriptions are essentially limited to the differences between the exemplary embodiments, wherein regarding components having the same denomination, in particular components having the same reference numerals, the drawings and/or the descriptions of the other exemplary embodiments, in particular of FIGS. 1 to 4, may principally be referred to. In order to distinguish between the exemplary embodiments, the letter a has been added to the reference numerals of the exemplary embodiment of FIGS. 1 to 4. In the exemplary embodiments of FIGS. 5 to 9 the letter a has been replaced by the letters b to e.

FIGS. 5 and 6 show an assembly kit according to the invention in a second exemplary embodiment. An aircraft seat is not shown in detail in FIGS. 5 and 6. Herewith FIG. 1 may principally be referred to, which shows the assembly kit 10a and the aircraft seat 24a in the first exemplary embodiment. If compared to the first exemplary embodiment, only an arrangement of a connection module is different in the second exemplary embodiment. The assembly kit 10b comprises a mounting unit 12b. The mounting unit 12b comprises at least one seat divider 84b. Viewed in a sitting direction (which is not shown in detail), the seat divider 84b is arranged on a righthand side of the aircraft seat. The assembly kit 10b comprises a backrest 14b. The backrest 14b comprises a rand 88b. The backrest 14b forms a backrest surface, which is not shown in detail. The backrest 14b is arranged in a backrest adjustment angle (not shown in detail) relative to the mounting unit 12b. The backrest 14b is in its assembled and ready-for-flight state non-adjustable. The backrest 14b has in the assembled and ready-for-flight state a standard position, a comfort position or an upright position. In the assembled and ready-for-flight state the backrest 14b is fixedly coupled with the mounting unit 12b. In the assembled and ready-for-flight state the backrest 14b is fixedly coupled with the seat divider 84b and a further seat divider, which is not shown in detail. The assembly kit 10b comprises two connection modules 28b. Viewed in the sitting direction, one connection module 28b is arranged on a righthand side of the backrest 14b. Viewed in the sitting direction, a further connection module, which is not shown in detail, is arranged on a lefthand side of the backrest 14b. The further connection module is in particular implemented in a mirrored fashion with respect to the connection module 28b.

The connection module 28b comprises an adjusting element 30b. By means of the adjusting element 30b the backrest 14b is orientable respectively in three different backrest adjustment angles with respect to the mounting unit 12b. The adjusting element 30b is implemented as an eccentric adjusting element (FIGS. 5 and 6). By means of the adjusting element 30b the backrest 14b is orientable respectively in three different backrest adjustment angles with respect to the mounting unit 12b. The adjusting element 30b is embodied as a round disk. The adjusting element 30b comprises a coupling element 32b, which is arranged eccentrically relative to the disk. The coupling element 32b is embodied as a bolt. The adjusting element 30b is supported rotatably. The adjusting element 30b has a rotation axis, which is not shown in detail. The adjusting element 30b is partly arranged in the backrest 14b. The adjusting element 30b is coupled with the backrest 14b. The adjusting element 30b is configured for an adjustment of a backrest adjustment angle. The backrest 14b comprises a support element 94b. The adjusting element 30b is supported against the backrest 14b via the support element 94b. The support element 94b has a groove 96b, which is configured for an adjustment of the adjusting element 30b. In the assembled and ready-for-flight state, the support element 94b is connected to the backrest 14b via a rivet 98b through the groove 96b.

The connection module 28b comprises three connection elements 34b, wherein only the first connection element 34b is shown in FIGS. 5 and 6. The connection module 28b comprises the first connection element 34b. The connection module 28b comprises two further connection elements, which are not shown in detail. The three connection elements 34b may principally correspond to the three connection elements 34a, 34b, 43c of the first exemplary embodiment. By means of the three connection elements 34b, the backrest 14b is fixedly mountable respectively in three different backrest adjustment angles to the mounting unit 12b. The three connection elements 34b are mountable without requiring new approval. The three connection elements 34b are exchangeable without requiring new approval. The three connection elements 34b are mutually interchangeable, wherein no new approval is necessary for the aircraft seat. The three connection elements 34b are implemented by spatially separable elements. In the assembled and ready-for-flight aircraft seat only one connection element 34b is mounted for each connection module 28b. In the assembled and ready-for-flight state the aircraft seat comprises exactly one connection element 34b for each connection module 28b. The two further connection elements contained in the assembly kit 10b, which are not shown in detail, are in the present case not mounted in the aircraft seat.

In the present case a backrest adjustment angle can be adjusted by means of the adjusting element 30b or by means of the three connection elements 34b. It is principally also conceivable that the connection module 28b comprises at least one adjusting element 30b or at least two connection elements 34b.

The first connection element 34b is embodied as a plate. The first connection element 34b is implemented as a single separate component. The first connection element 34b is made of a metallic material, in particular a metal sheet. The first connection element 34b comprises two connection points 40b, 42b. The first connection element 34b comprises a first connection point 40b, via which the first connection element 34b is fixedly couplable with the mounting unit 12b. The first connection element 34b comprises a second connection point 42b, via which the first connection element 34b is fixedly couplable with the backrest 14b. The first connection point 40b of the first connection element 34b is realized as a through hole. The second connection point 42b of the first connection element 34b is realized as a through hole. The first connection element 34b comprises a first destruction point 44b. The first destruction point 44b is realized as waist. Alternatively, the mounting unit 12b could also be coupled with the second connection point 42b of the first connection element 34b, and the backrest 14b could be coupled with the first connection point 40b of the first connection element 34b. The connection element 34b is partly arranged in a frame of the backrest 14b.

The seat divider 84b comprises a connecting element 90b (FIGS. 5 and 6). The connecting element 90b is configured for a coupling with the backrest 14b. The connection module comprises a bolt 68b. The bolt 68b is configured to be slid into the connecting element 90b. In an assembled and ready-for-flight state, the bolt 68b is safeguarded by a clamping pin, which is not shown in detail. Principally the bolt 68b could also be screwed into the connecting element 90b. The seat divider 84b comprises a further connecting element 92b. The further connecting element 92b is configured for a coupling with a further backrest, which is not shown in detail. In particular, the assembly kit 10b does not comprise a securing element.

In FIGS. 7 to 9 an assembly kit according to the invention is shown only partially. In FIGS. 7 to 9 an aircraft seat is not shown in detail. Herein FIGS. 1 to 3, which show the assembly kit 10a and the aircraft seat 24a in the first exemplary embodiment, may principally be referred to. Differently than in the first exemplary embodiment, only connection elements are implemented in different ways in the three following exemplary embodiments. The assembly kit comprises at least one connection module, which is shown partially. The assembly kit comprises a mounting unit, which is not shown in detail. The assembly kit comprises a backrest, which is not shown in detail. The backrest is oriented with respect to the mounting unit in a backrest adjustment angle (not shown in detail). In an assembled and ready-for-flight state the backrest is non-adjustable. In the assembled and ready-for-flight state the backrest has a standard position, a comfort position or an upright position. In the assembled and ready-for-flight state the assembly kit implements the aircraft seat. The aircraft seat is produced by means of the assembly kit according to the invention.

FIG. 7 shows two connection elements 34c, 36c in a third exemplary embodiment. The connection module comprises the first connection element 34c. The connection module comprises the second connection element 36c. The two connection elements 34c, 36c are implemented integrally as a single component. The two connection elements 34c, 36c are mountable in a first mounting position and a second mounting position. In the assembled and ready-for-flight aircraft seat both connection elements 34c, 36c are mounted. The two connection elements 34c, 36c are realized as a plate. The two connection elements 34c, 36c are made of a metallic material, in particular a metal sheet. By means of the two connection elements 34c, 36c, the backrest is fixedly mountable relative to the mounting unit respectively in two different backrest adjustment angles. The two connection elements 34c, 36c are mountable without requiring new approval. The two connection elements 34c, 36c are exchangeable without requiring new approval. The two connection elements 34c, 36c are mountable in two different mounting positions, no new approval of the aircraft seat being required in both mounting positions.

The first connection element 34c comprises two connection points 40c, 42c. The first connection element 34c comprises a first connection point 40c, via which the first connection element 34c is fixedly couplable with the mounting unit. The first connection element 34c comprises a second connection point 42c, via which the first connection element 34c is fixedly couplable with the backrest. The first connection point 40c of the first connection element 34c is realized as a through hole. The second connection point 42c of the first connection element 34c is realized as a through hole. The first connection element 34c comprises a first destruction point 44c. The first destruction point 44c is realized as a waist.

The second connection element 36c comprises two connection points 46c, 48c. The second connection element 36c comprises a first connection point 46c, via which the second connection element 36c is fixedly couplable with the mounting unit. The first connection point 46c of the second connection element 36c is implemented as the first connection point 40c of the first connection element 34c. The second connection element 36c comprises a second connection point 48c, via which the second connection element 36c is fixedly couplable with the backrest. The second connection point 48c of the second connection element 36c is realized as a through hole. The second connection element 36c comprises a second destruction point 50c. The second destruction point 50c is implemented as the first destruction point 44c.

A first distance 58c between the first connection point 40c and the second connection point 42c of the first connection element 34c differs from a second distance 60c between the first connection point 46c and the second connection point 48c of the second connection element 36c. The first distance 58c and the second distance 60c are configured to adjust two different backrest adjustment angles. The first distance 58c is configured for an adjustment of the standard position. The second distance 60c is configured for an adjustment of the comfort position.

FIG. 8 shows three connection elements 34d, 36d, 38d in a fourth exemplary embodiment. The connection module comprises the first connection element 34d. The connection module comprises the second connection element 36d. The connection module comprises the third connection element 38d. The three connection elements 34d, 36d, 38d are implemented integrally as a single component. The three connection elements 34d, 36d, 38d are mountable in a first mounting position, in a second mounting position and in a third mounting position. In the assembled and ready-for-flight aircraft seat all three connection elements 34d, 36d, 38d are mounted. The three connection elements 34d, 36d, 38d are realized as a plate. The three connection elements 34d, 36d, 38d are made of a metallic material, in particular a metal sheet. By means of the three connection elements 34d, 36d, 38d, the backrest is fixedly mountable relative to the mounting unit respectively in three different backrest adjustment angles. The three connection elements 34d, 36d, 38d are mountable without requiring new approval. The three connection elements 34d, 36d, 38d are exchangeable without requiring new approval. The three connection elements 34d, 36d, 38d are mountable in three different mounting positions, no new approval of the aircraft seat being required in regard to the mounting positions.

The first connection element 34d comprises two connection points 40d, 42d. The first connection element 34d comprises a first connection point 40d, via which the first connection element 34d is fixedly couplable with the mounting unit. The first connection element 34d comprises a second connection point 42d, via which the first connection element 34d is fixedly couplable with the backrest. The first connection point 40d of the first connection element 34d is realized as a through hole. The second connection point 42d of the first connection element 34d is realized as a through hole.

The second connection element 36d comprises two connection points 46d, 48d. The second connection element 36d comprises a first connection point 46d, via which the second connection element 36d is fixedly couplable with the mounting unit. The first connection point 46d of the second connection element 36d is implemented as the first connection point 40d of the first connection element 34d. The second connection element 36d comprises a second connection point 48d, via which the second connection element 36d is fixedly couplable with the backrest. The second connection point 48d of the second connection element 36d is realized as a through hole.

The third connection element 38d comprises two connection points 52d, 54d. The third connection element 38d comprises a first connection point 52d, via which the third connection element 38d is fixedly couplable with the mounting unit. The first connection point 52d of the third connection element 38d is implemented as the first connection point 40d of the first connection element 34d. The third connection element 38d comprises a second connection point 54d, via which the third connection element 38d is fixedly couplable with the backrest. The second connection point 54d of the third connection element 38d is realized as a through hole.

A first distance 58d between the first connection point 40d and the second connection point 42d of the first connection element 34d differs from a second distance 60d between the first connection point 46d and the second connection point 48d of the second connection element 36d. The second distance 60d between the first connection point 46d and the second connection point 48d of the second connection element 36d differs from a third distance 62d between the first connection point 52d and the second connection point 54d of the third connection element 38d. The third distance 62d between the first connection point 52d and the second connection point 54d of the third connection element 38d differs from the first distance 58d between the first connection point 40d and the second connection point 42d of the first connection element 34d. The first distance 58d, the second distance 60d and the third distance 62d are configured to adjust three different backrest adjustment angles. The first distance 58d is configured for an adjustment of the standard position. The second distance 60d is configured for an adjustment of the comfort position. The third distance 62d is configured for an adjustment of the upright position.

FIG. 9 shows three connection elements 34e, 36e, 38e in a fifth exemplary embodiment. The connection module comprises the first connection element 34e. The connection module comprises the second connection element 36e. The connection module comprises the third connection element 38e. The three connection elements 34e, 36e, 38e are implemented integrally as a single component. The three connection elements 34e, 36e, 38e are mountable in a first mounting position, in a second mounting position and in a third mounting position. In the assembled and ready-for-flight aircraft seat all three connection elements 34e, 36e, 38e are mounted. The three connection elements 34e, 36e, 38e are implemented as a plate. The three connection elements 34e, 36e, 38e are made of a metallic material, in particular a metal sheet. By means of the three connection elements 34e, 36e, 38e, the backrest is fixedly mountable relative to the mounting unit respectively in three different backrest adjustment angles. The three connection elements 34e, 36e, 38e are mountable without requiring new approval. The three connection elements 34e, 36e, 38e are exchangeable without requiring new approval. The three connection elements 34e, 36e, 38e are mountable in three different mounting positions, no new approval of the aircraft seat being required in regard to the mounting positions.

The first connection element 34e comprises two connection points 40e, 42e. The first connection element 34e comprises a first connection point 40e, via which the first connection element 34e is fixedly couplable with the mounting unit. The first connection element 34e comprises a second connection point 42e, via which the first connection element 34e is fixedly couplable with the backrest. The first connection point 40e of the first connection element 34e is realized as a through hole. The second connection point 42e of the first connection element 34e is realized as a through hole.

The second connection element 36e comprises two connection points 46e, 48e. The second connection element 36e comprises a first connection point 46e, via which the second connection element 36e is fixedly couplable with the mounting unit. The first connection point 46e of the second connection element 36e is realized as a through hole. The second connection element 36e comprises a second connection point 48e, via which the second connection element 36e is fixedly couplable with the backrest. The second connection point 48e of the second connection element 36e is implemented as the second connection point 42e of the first connection element 34e.

The third connection element 38e comprises two connection points 52e, 54e. The third connection element 38e comprises a first connection point 52e, via which the third connection element 38e is fixedly couplable with the mounting unit. The first connection point 52e of the third connection element 38e is implemented as the first connection point 46e of the second connection element 36e. The third connection element 38e comprises a second connection point 54e, via which the third connection element 38e is fixedly couplable with the backrest. The second connection point 54e of the third connection element 38e is realized as a through hole.

A first distance 58e between the first connection point 40e and the second connection point 42e of the first connection element 34e differs from a second distance 60e between the first connection point 46e and the second connection point 48e of the second connection element 36e. The second distance 60e between the first connection point 46e and the second connection point 48e of the second connection element 36e differs from a third distance 62e between the first connection point 52e and the second connection point 54e of the third connection element 38e. The third distance 62e between the first connection point 52e and the second connection point 54e of the third connection element 38e differs from the first distance 58e between the first connection point 40e and the second connection point 42e of the first connection element 34e. The first distance 58e, the second distance 60e and the third distance 62e are configured to adjust three different backrest adjustment angles. The first distance 58e is configured for an adjustment of the standard position. The second distance 60e is configured for an adjustment of the comfort position. The third distance 62e is configured for an adjustment of the upright position.

REFERENCE NUMERALS 10 assembly kit
12 mounting unit
14 backrest
16 standard position
18 comfort position
20 upright position
22 coupling point
24 aircraft seat
26 sitting direction
28 connection module
30 adjusting element
32 coupling element
34 connection element
36 connection element
38 connection element
40 connection point
42 connection point
44 destruction point
46 connection point
48 connection point
50 destruction point
52 connection point
54 connection point
56 destruction point
58 distance
60 distance
62 distance
64 securing element
66 guiding groove
68 bolt
70 delay element
72 attachment part
74 adjusting unit
76 seat foot
78 seat foot
80 crossbeam
82 crossbeam
84 seat divider
86 covering
88 rand
90 connecting element
92 connecting element
94 support element
96 groove
98 rivet

The invention claimed is:

1. An assembly kit for an aircraft seat, with at least one mounting unit, with at least one backrest which is fixedly coupled with the mounting unit in a state when assembled and ready for flight, and with at least one connection module, via which the backrest is in particular oriented rigidly in a position relative to the mounting unit in the assembled and ready-for-flight state,
wherein the connection module comprises at least one adjusting element, by means of which the backrest is orientable respectively in at least two different backrest adjustment angles relative to the mounting unit without requiring new approval, and/or comprises at least two connection elements, by means of which the backrest can be fixedly mounted respectively in at least two different backrest adjustment angles relative to the mounting unit, the at least two connection elements being mountable without requiring new approval,
wherein without requiring new approval means that no new approval is necessary for an approved aircraft seat if the backrest adjustment angle is changed between +3 degrees and −3 degrees with respect to the standard position of the backrest, taking the manufacturing tolerance of +1 degree and −1 degree into account, and
wherein the backrest is not adjustable in its assembled and ready-for-flight state.

2. The assembly kit according to claim 1, wherein the at least two connection elements are implemented by spatially separable elements.

3. The assembly kit according to claim 1, wherein the at least one adjusting element is implemented as an eccentric adjusting element.

4. The assembly kit according to claim 1, wherein at least one of the connection elements is realized as a plate.

5. The assembly kit according to claim 1, wherein at least one of the connection elements has at least two connection points.

6. The assembly kit at least according to claim 5, wherein at least one of the connection elements comprises at least one first connection point, via which the at least one connection element is fixedly couplable with the mounting unit, and comprises at least one second connection point, via which the at least one connection element is fixedly couplable with the backrest.

7. The assembly kit according to claim 1, wherein at least one of the connection elements comprises at least one destruction point.

8. An aircraft seat, produced by means of an assembly kit according to claim 1.

9. The assembly kit according to claim 1, wherein
the at least two different backrest adjustment angles include a standard angle corresponding to a standard position of the backrest and an upright angle corresponding to an upright position of the backrest, and
the upright angle is no more than 4° greater than the standard angle.

10. The assembly kit according to claim 1, wherein
the at least two different backrest adjustment angles include a standard angle corresponding to a standard position of the backrest and a comfort angle corresponding to a comfort position of the backrest, and
the comfort angle is no more than 4° smaller than the standard angle.

11. The assembly kit according to claim 1, wherein
the at least two different backrest adjustment angles include a standard angle corresponding to a standard position of the backrest, an upright angle corresponding to an upright position of the backrest, and a comfort angle corresponding to a comfort position of the backrest,
the upright angle is no more than 4° greater than the standard angle, and
the comfort angle is no more than 4° smaller than the standard angle.

\* \* \* \* \*